(12) United States Patent
Elangovan et al.

(10) Patent No.: US 9,469,408 B1
(45) Date of Patent: Oct. 18, 2016

(54) ICE PROTECTION SYSTEM AND METHOD

(71) Applicant: The Boeing Company, Chicago, IL (US)

(72) Inventors: Rangasamy Elangovan, Bothell, WA (US); Vyacheslav Khozikov, Seattle, WA (US); Stephen Roger Amorosi, Seattle, WA (US); Marc Matsen, Seattle, WA (US); Morteza Safai, Seattle, WA (US); Robert Miller, Fall City, WA (US)

(73) Assignee: The Boeing Company, Chicago, IL (US)

( * ) Notice: Subject to any disclaimer, the term of this patent is extended or adjusted under 35 U.S.C. 154(b) by 38 days.

(21) Appl. No.: 13/971,489

(22) Filed: Aug. 20, 2013

Related U.S. Application Data (63) Continuation-in-part of application No. 12/553,481, filed on Sep. 3, 2009, now Pat. No. 8,777,163.

(51) Int. Cl.
*B64D 15/12* (2006.01)

(52) U.S. Cl.
CPC .................................... *B64D 15/12* (2013.01)

(58) Field of Classification Search
CPC ............... B64D 15/00; B64D 2700/62078; B64D 2033/0233; B64D 15/12; F02C 7/047; H05B 6/02; H05B 6/36; H05B 6/00; H05B 6/10; H05B 6/105
USPC ...................................................... 244/134 D
See application file for complete search history.

(56) References Cited

U.S. PATENT DOCUMENTS

| | | | |
|---|---|---|---|
| 1,819,497 A * | 8/1931 | Chisholm | 244/134 D |
| 2,142,785 A * | 1/1939 | Hanson | 219/618 |
| 4,752,673 A * | 6/1988 | Krumme | 219/553 |
| 4,895,322 A | 1/1990 | Zieve | |
| 5,553,815 A | 9/1996 | Adams et al. | |
| 6,371,411 B1 | 4/2002 | Breer et al. | |
| 6,448,558 B1 | 9/2002 | Greene | |
| 6,457,676 B1 | 10/2002 | Breer et al. | |
| 2003/0002559 A1* | 1/2003 | Fishman et al. | H05B 6/24 373/146 |
| 2005/0061804 A1* | 3/2005 | Golm | 219/635 |
| 2007/0102582 A1* | 5/2007 | Botura | 244/134 D |
| 2008/0251642 A1* | 10/2008 | Boschet et al. | 244/134 D |
| 2008/0304539 A1 | 12/2008 | Safai et al. | |
| 2009/0129431 A1 | 5/2009 | Safai et al. | |
| 2010/0206990 A1* | 8/2010 | Petrenko | B64D 15/163 244/134 D |
| 2011/0049300 A1 | 3/2011 | Safai et al. | |

* cited by examiner

*Primary Examiner* — Tien Dinh
*Assistant Examiner* — Vicente Rodriguez
(74) *Attorney, Agent, or Firm* — Alston & Bird LLP (57) ABSTRACT

An ice protection system and method are provided that facilitate the prevention or reduction in ice formation upon an aerodynamic surface. The ice protection system may include an aerodynamic surface that includes a susceptor formed of a ferromagnetic material that is located proximate an outer mold line of a leading edge of the aerodynamic surface. The ice protection system may also include at least one induction coil and a signal source configured to provide alternating current to the at least one induction coil to thereby generate an electromagnetic field. The electromagnetic field creates an eddy current in the susceptor so as to heat the leading edge of the aerodynamic surface. A corresponding ice protection method is also provided.

20 Claims, 5 Drawing Sheets

ICE PROTECTION SYSTEM AND METHOD

CROSS-REFERENCE TO A RELATED APPLICATION

The present application is a continuation-in-part of U.S. patent application Ser. No. 12/553,481, filed Sep. 3, 2009, the contents of which are incorporated herein in their entirety.

TECHNOLOGICAL FIELD

Embodiments of the present disclosure relate generally to ice protection systems and methods and, more particularly, to systems and methods for preventing or reducing the icing of an aerodynamic surface.

BACKGROUND

Aircraft and other air vehicles may be subject to the formation of ice, such as upon the various leading edges, when exposed to icing conditions. Similarly, other aerodynamic surfaces, such as the blades of a wind turbine or a rotorcraft, may be subject to the formation of ice when exposed to icing conditions. Ice formation upon a leading edge of an aerodynamic surface may have an adverse effect upon the performance of the aircraft, rotorcraft, wind turbine or the like. As such, various ice protection systems have been developed to prevent or reduce the formation of ice, at least upon selected aerodynamic surfaces. In this regard, ice protection systems may heat a leading edge or other aerodynamic surface to a temperature above that suitable for ice formation in order to prevent or reduce ice formation.

With respect to aerodynamic surfaces formed of one or more thermally conductive layers of material, heating elements may be disposed within the aerodynamic surface with the heat generated by the heating elements propagating through the thermally conductive layers so as to heat the leading edge or other aerodynamic surface. For example, the heating element may be formed of a patterned metal layer with associated wiring that is embedded within a composite skin structure. While an embedded heating element may heat the leading edge, the embedded heating element may also heat other portions of the composite skin structure, such as the entire composite skin structure, thereby resulting in inefficiencies with respect to the heating. Additionally, an embedded heating element adds to the manufacturing costs of the aerodynamic surface and is not generally repairable.

Additionally, heating techniques that rely upon an embedded heating element may be insufficient, however, for aerodynamic surfaces that are not formed of thermally conductive materials. By way of example, the inlet lip surface of an engine nacelle may include an acoustic liner for attenuating inlet noise. In this regard, the inlet lip surface of an engine nacelle may be lined with an acoustic liner having a honeycomb core sandwiched between a perforated composite face sheet and a solid composite back sheet. An inlet lip surface of an engine nacelle may also include a porous metallic erosion barrier that overlies the porous composite face sheet in order to protect the acoustic liner.

Although the acoustic liner may prove effective for attenuating inlet noise, the acoustic liner and, in particular, the honeycomb core and the air contained within the cells of the honeycomb core may effectively thermally insulate the exterior surface, that is, the porous metallic erosion barrier, upon which ice may form from heat that may be generated by heating elements positioned within the inlet lip surface, such as heating elements positioned interior of the composite back sheet. As such, conventional heating methods may prove less effective than desired with respect to protecting an inlet lip surface having an acoustic panel from ice formation.

Another technique for restricting ice formation relies upon bleed air that has been heated and is recirculated to the inlet lip surface of the engine nacelle in order to heat the inlet lip surface. As will be apparent, ice protection systems that rely upon bleed air are not effective for electric aircraft or other systems that do not have bleed air available. Moreover, the generally static air within the cells of the honeycomb core of an acoustic liner may also insulate the exterior surface from the bleed air, thereby reducing the heat transfer rate to the exterior surface and/or increasing the amount of bleed air required to protect the exterior surface from ice formation.

Ice protection systems are being developed for aerodynamic surfaces that include acoustic liners. For example, a low-power electrical de-icing system utilizes embedded wire mesh heating elements disposed within a composite layer positioned near the exterior erosion barrier. The wire mesh heating elements of a low-power electrical de-icing system may disadvantageously increase the weight of the aerodynamic surface may consume a meaningful amount of power in order to support current flow through the entire wire mesh network, may be sensitive to external impacts upon the aerodynamic surface and may have increased maintenance costs. As a result of the power consumption, the power supply of the low-power electrical de-icing system may need to be sized in such manner that it also disadvantageously increases the weight and the cost of the aerodynamic surface. As another example, a transpiration flow anti-icing system is also being developed for titanium lip inlets having acoustic liners. A transpiration flow anti-icing system requires engine bleed air and is therefore inapplicable with respect to an electric aircraft or other system in which bleed air is unavailable. Also, since the upper temperature limit of the composite materials that are employed in acoustic liners is about 220° F. and since the bleed air temperatures are substantially higher, such as between about 800° F. and 1100° F., a transpiration flow anti-icing system may not be suitable for anti-icing an acoustically treated aerodynamic surface that employs composite materials.

The anti- or de-icing treatment of the other aerodynamic surfaces, such as the leading edges of wings and empennage and front or nose of an aircraft may also be subject to similar considerations and constraints. For instance, the leading edge of a wing that is built from composite materials and includes a metallic erosion shield may be sensitive to temperatures incurred during anti- or de-icing that exceed the thermal limits of the composite materials

SUMMARY

An ice protection system and method are provided according to embodiments of the present disclosure that facilitate the prevention or reduction in ice formation upon an aerodynamic surface. The ice protection system utilizes induction coil(s) to generate an electromagnetic field that creates eddy currents in a susceptor formed of a ferromagnetic material that is located so as to heat the aerodynamic surface in an efficient manner. By relying upon the generation of electromagnetic fields, the induction coil(s) of one embodiment may be separated from the aerodynamic surface by one or more layers that may be relatively electrically and thermally insulative, while still effectively heating the aerodynamic surface. Moreover, the susceptor and/or the induction coil(s) may be positioned so as to be accessible and, consequently, repairable, such as proximate an outer mold line of the aerodynamic surface with respect to the susceptor or proximate either the outer mold line or the inner mold line of the aerodynamic surface with respect to the induction coil(s).

In one embodiment, an ice protection system is provided that includes an aerodynamic surface that includes a susceptor formed of a ferromagnetic material proximate an outer mold line of a leading edge of the aerodynamic surface. The ice protection system may include various aerodynamic surfaces including the leading edge flap of a wing, the leading edge of a wing, the leading edge of a wind turbine light, a leading edge of a engine nacelle inlet, a leading edge of a rotorcraft blade, a leading edge of an empennage and a nose of an aircraft. The ice protection system of this embodiment also includes at least one induction coil and a signal source configured to provide alternating current to the at least one induction coil. In response to the alternating current, the at least one induction coil generates an electromagnetic field that creates an eddy current in the susceptor so as to heat the leading edge of the aerodynamic surface. The ferromagnetic material of the susceptor has a Curie point such that the heating of the leading edge of the aerodynamic surface by the susceptor may be correspondingly limited based upon the Curie point.

The ice protection system may also include a magnetic flux concentrator positioned interior of the at least one induction coil so as to be spaced apart from the susceptor by the at least one induction coil. The magnetic flux concentrator of this embodiment is configured to redirect the electromagnetic field toward the susceptor.

The ice protection system may also include an erosion control layer that defines the outer mold line. The erosion control layer of one embodiment may be formed of the susceptor. The ice protection system of one embodiment may also include an applique that includes the susceptor and is attached to the aerodynamic surface. In another embodiment, the outer mold line of the leading edge may include a non-magnetic material. In this embodiment, the susceptor may be positioned within the non-magnetic material. Alternatively, the susceptor may be positioned interior of, but in thermal communication with the non-magnetic material. The ice protection system may also include a supporting structure interior of the susceptor relative to the outer mold line. In this embodiment, the at least one induction coil may be positioned interior of the supporting structure so as to be spaced from the susceptor by the supporting structure. In one embodiment, the ice protection system may also include an applique that includes the at least one induction coil and is attached to an inner mold line of the aerodynamic surface. Alternatively, the at least one induction coil may be proximate the susceptor at the outer mold line.

In another embodiment, an ice protection method is provided that includes providing alternating current to at least one induction coil and generating an electromagnetic field in response to the alternating current. The electromagnetic field creates an eddy current in a susceptor formed of the ferromagnetic material with the susceptor being positioned proximate an outer mold line of a leading edge of the aerodynamic surface. The ice protection method also includes heating the leading edge of the aerodynamic surface in response to the eddy current created in the susceptor. Since the ferromagnetic material of the susceptor has a Curie point, the heating of the aerodynamic surface may be limited by the susceptor based upon the Curie point of the susceptor.

While various types of leading edges of aerodynamic surfaces may be heated, the ice protection method of an example embodiment may heat the leading edge flap of the wing, the leading edge of a wing, the leading edge of wind turbine blade, the leading edge of an engine nacelle inlet, a leading edge of a rotorcraft blade, a leading edge of an empennage and a nose of an aircraft.

The ice protection method of one embodiment also includes applying an applique that includes the susceptor to the aerodynamic surface. In another embodiment, the outer mold line of the leading edge may include a non-magnetic material. In this embodiment, the susceptor may be positioned within the non-magnetic material or may be positioned interior of, but in thermal communication with the non-magnetic material. The ice protection method of one embodiment also includes providing a supporting structure interior of the susceptor relative to the outer mold line. In this embodiment, the at least one induction coil is positioned interior of the supporting structure so as to be spaced from the susceptor by the supporting structure. The ice protection method of one embodiment also includes applying an applique that includes the at least one induction coil to an inner mold line of the aerodynamic surface. The ice protection method of one embodiment may also include redirecting the electromagnetic field generated by the at least one induction coil toward the susceptor with a magnetic flux concentrator positioned interior of the at least one induction coil so as to be spaced apart from the susceptor by the at least one induction coil.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

As described below, an ice protection system 10 and method are provided for preventing or reducing the formation of ice upon an aerodynamic surface. Although primarily described below in conjunction with the prevention or reduction of ice formation upon an engine nacelle inlet, the ice protection system and method may be employed in conjunction with a variety of other aerodynamic surfaces, such as the leading edge of an aircraft wing, the leading edge of a flap, the leading edge of a blade, such as a blade of a wind turbine, the leading edge of a rotorcraft blade, the leading edge of an empennage, the nose of an aircraft or the like. By way of example of the application of the ice protection and system of one embodiment, however, an engine nacelle inlet is described below in conjunction with FIGS. 1-3. Although the nacelle inlet is described in conjunction with an aircraft turbine engine, the engine nacelle inlet that is protected by the ice protection system and method of embodiments of the present disclosure may be advantageously employed in conjunction with other types of engines, including electric engines, for example.

Figure 1:
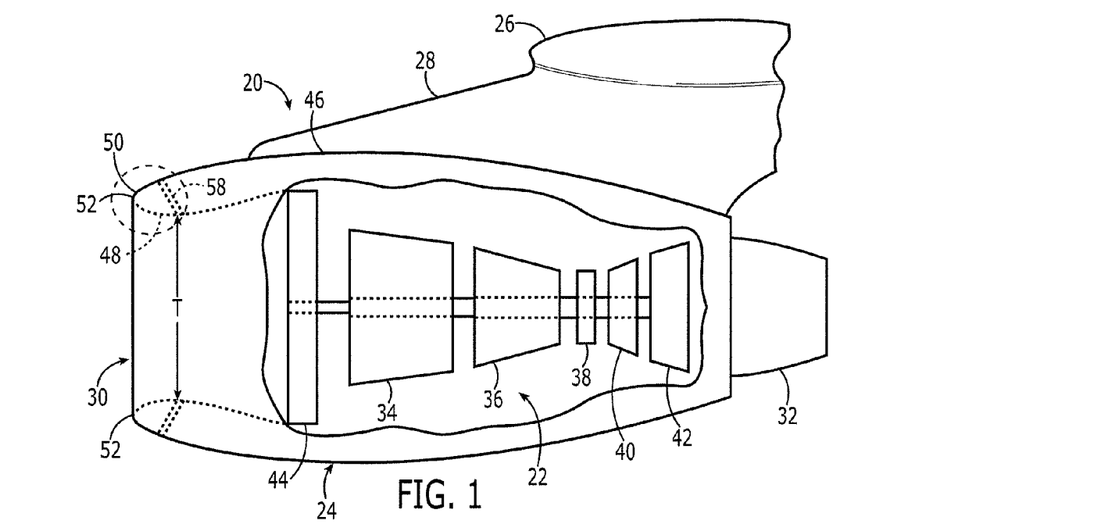
FIG. 1 is a schematic side elevational view of an aircraft turbine engine mounted in a nacelle and incorporating an ice protection system in accordance with one embodiment of the present disclosure.

Referring now to FIG. 1, a partially schematic, side elevational view of an aircraft turbine engine assembly 20 is provided. The aircraft turbine engine assembly includes a turbine engine 22 housed in a nacelle 24 secured to a wing 26 by a strut 28. The nacelle includes an inlet 30 that supplies air to the turbine engine and a tail pipe 32 that directs exhaust products away from the engine.

In this embodiment, the engine 22 includes a low-pressure compressor 34 and a high-pressure compressor 36 mounted on concentric spools. The compressors pressurize the air provided by the inlet 30 and direct the pressurized air to a combustor 38. In the combustor, the pressurized air is mixed with fuel and burned. The hot exhaust products pass through a high-pressure turbine 40 (which drives the high-pressure compressor) and through a low-pressure turbine 42 (which drives the low-pressure compressor and a fan 44) before exiting through the tail pipe 32.

The inlet 30 may be configured to have a relatively low external and internal drag. Accordingly, the inlet can include a smoothly contoured external surface 46, a smoothly contoured internal surface 48 and a lip surface 50 extending between the external and internal surfaces. The lip surface defines the leading edge or hilite 52 at its forward-most point, and either the lip surface or the internal surface defines a minimum inlet flow area or throat T of the hilite. During some flight conditions, water droplets may impinge on the inlet in the region that extends generally from the hilite internally to the throat T and external along the external surface. Thus, the ice protection system and method of one embodiment is configured to prevent the water droplets from forming into ice or, if ice should form, to reduce the ice formation, either by reducing the thickness of the ice formation or reducing the rate at which the ice is formed.

Figure 2:
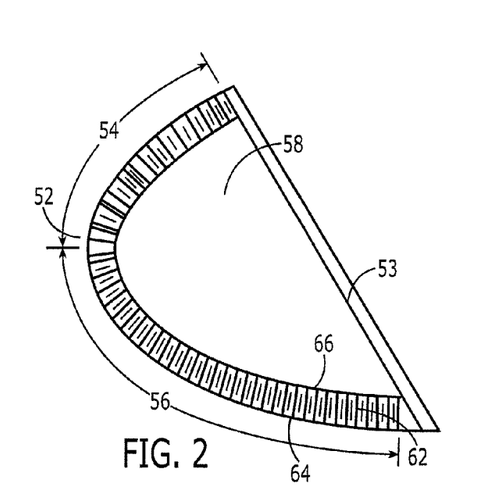
FIG. 2 is a partial cross-sectional side elevational view of that portion of the nacelle circled in FIG. 1.
Figure 3:
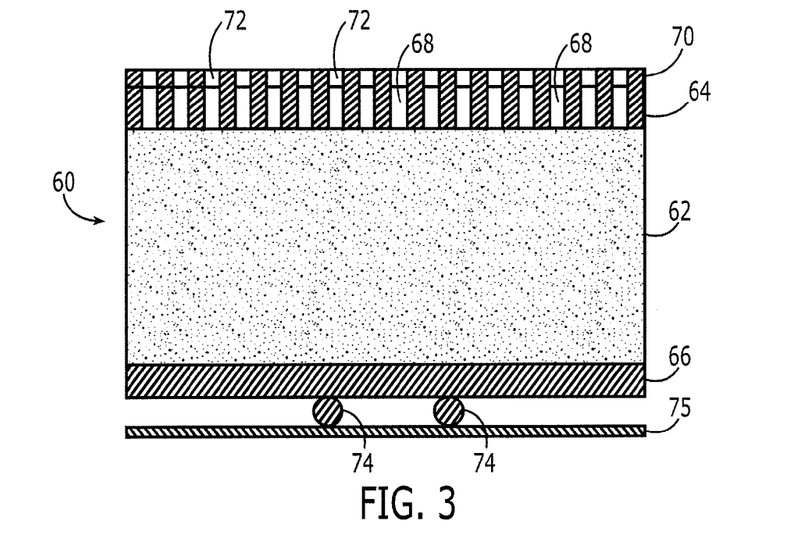
FIG. 3 is a cross-sectional view of a portion of the nacelle of FIGS. 1 and 2 which illustrates the induction coils in accordance with one embodiment of the present disclosure.

Further details regarding the engine nacelle inlet lip surface are depicted in FIGS. 2 and 3. In this regard, FIG. 2 depicts the circled portion of the nacelle inlet lip surface of FIG. 1 which includes, in the illustrated example, that portion of the engine nacelle forward of the bulkhead 53. As also shown, the engine nacelle inlet lip surface of this embodiment includes an outer lip 54 which is defined to be that portion of the external surface 48 between the hilite and the bulkhead and an inner lip 56 which is defined to be that portion of the internal surface 48 between the hilite and the bulkhead. Additionally, the engine nacelle inlet lip surface of the illustrated embodiment defines a duct 58 therewithin.

The engine nacelle inlet lip surface of one embodiment includes an acoustic liner 60 as shown, for example, in FIG. 2 and more particularly, in FIG. 3. As shown, the acoustic liner may include a honeycomb core 62 positioned between a face sheet 64 and a back sheet 66. The face sheet and the back sheet may be formed of various materials including a metallic material, such as aluminum, titanium or a laminated composite material such as a carbon or glass reinforced plastic material. The honeycomb core generally includes a plurality of honeycomb cells. In some embodiments, the core may also include one or more septums extending through the plurality of honeycomb cells. The honeycomb core, including the cells and any septum(s), may also be formed of various materials including a metallic material, such as aluminum, titanium, metal matrix or a composite material such as a NOMAX® material available from E.I. DuPont de Nemours & Company. The face sheet may define a plurality of perforations that open into and are in fluid communication with respective honeycomb cells. As such, air flowing to or through the fan 44 may enter the core through the perforations, thereby reducing engine noise. The acoustic liner of one embedment may also include an erosion barrier 70 positioned upon and exterior to the face sheet. While the erosion barrier may be formed of a metallic material, such as aluminum, titanium, metal matrix or a perforated metal, the erosion barrier of one embodiment may be formed of a ferromagnetic material as described below. The erosion barrier may also define a plurality of perforations 72. As shown, for example, in FIG. 3, the perforations defined by the erosion barrier may be aligned with and generally coextensive with the perforations defined by the face sheet in order to facilitate fluid communication with the cells of the honeycomb core.

As a result of the substantial volume of air space within the honeycomb core 62, the acoustic liner 60 generally has relatively low thermal and electrical conductivity from its interior surface proximate the back sheet 66 to its exterior surface proximate the erosion barrier 70. Additionally, in embodiments in which the face sheet 64 and/or the back sheet are formed of composite materials, the thermal and/or electrical conductivity of these sheets may also be relatively low and may further reduce the thermal and/or electrical conductivity of the acoustic liner.

Figure 4:
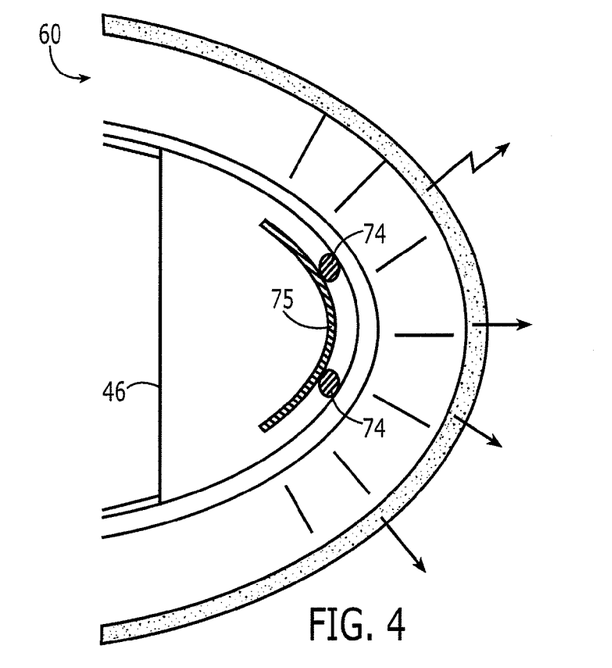
FIG. 4 is a schematic cross-sectional view of a portion of a nacelle illustrating the heating of the exterior surface by a pair of induction coils in accordance with one embodiment of the present disclosure.
Figure 5:
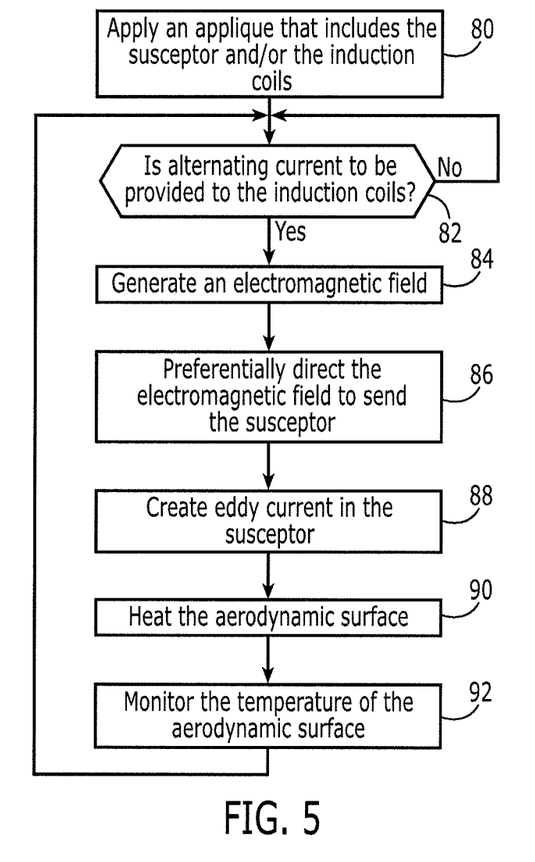
FIG. 5 is a flow chart illustrating operations performed in accordance with a method of one embodiment of the present disclosure.

The ice protection system 10 of one embodiment includes an induction heating coil 74 and, more typically, a plurality of induction heating coils. The induction heating coils are generally provided within an aerodynamic surface. For example, the induction heating coils of one embodiment may be positioned proximate to, but interior of the acoustic liner 60. As shown in FIGS. 3 and 4, for example, the induction coils may be positioned adjacent to, but interior of the face sheet 64. In one embodiment, the induction coils may be positioned along the inner mold line of the aerodynamic surface. As such, the induction coils of the illustrated embodiment are spaced apart from the exterior surface that may be subject to ice accumulation. In regards to the embodiment of FIGS. 3 and 4, the induction coils may be spaced apart from the exterior surface by the acoustic liner including the face sheet, the back sheet 66 and the honeycomb core 62 disposed there between. The induction coils are configured, however, such that by passing alternating current through the induction coils, an electromagnetic field is generated having a frequency, for example, of 5 to 500 kHz. See operations 82 and 84 of FIG. 5.

In order to preferentially direct the electromagnetic field toward the leading edge of the aerodynamic surface, the induction coils 74 may have a predefined shape, such as a pancake shape, a hairpin shape, a paperclip shape or the like. In addition or alternatively, the induction coils may be disposed within a faraday cage and/or appropriately grounded. An induction coil may consist of one wire spiraling around a center point forming, in one embodiment, a pancake-like, flat coil or several wires connected in parallel and spiraling around the center point of a coil while being horizontally or vertically stacked or being stacked in a mixed way such that some wires put together increase the size in one dimension distinctive from the radial dimension and the other wires put together increase the size in a second dimension, distinctive from the first dimension and the radial dimension. The coils may have various shapes including, for example, circular, rectangular, square, triangular, octagonal or other shapes. In another embodiment, a set of coils may form a meander path. In yet another embodiment, a set of coils may have a form distinctive from the flat one such as a solenoid, toroid or a Helmholtz-like form. The wires used to build coils may be made from a solid material, may be hollow, may be ribbon-like, may be made from a Litz wire or the like. The wires of an induction coil may be formed of various materials including copper, aluminum or other alloys. The induction coils may be driven by power supply(ies) at a resonant frequency that is specific to a specific coil, temperature profile, susceptor, composite material and/or a part of the leading edge of the aerodynamic surface. A set of induction coils may be driven by one or more power supplies in parallel or in series.

Figure 6:
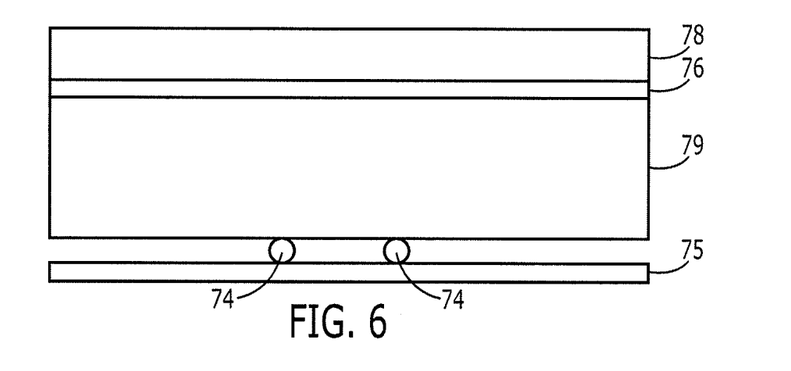
FIG. 6 is a cross-sectional view of a composite structure including an ice protection system in accordance with another embodiment of the present disclosure.

As shown in FIGS. 3, 4 and 6, the ice protection system 10 may also include a magnetic flux concentrator 75 that is positioned interior of the induction coils 74 such that the induction coils are positioned between the leading edge of the aerodynamic surface and the magnetic flux concentrator. The magnetic flux concentrator is configured to preferentially direct the electromagnetic field generated by the alternating current flowing through the induction coils toward the leading edge of the aerodynamic surface. See operation 86 of FIG. 5. By redirecting the electromagnetic field toward the leading edge of the aerodynamic surface, the magnetic flux concentrator may increase the efficiency of the ice protection system by causing a greater percentage of the electromagnetic field to be directed toward and to heat the leading edge, as described below. Additionally, the magnetic flux concentrator may correspondingly reduce the penetration of the electromagnetic field to regions interior of the magnetic field concentrator, thereby protecting these regions by screening and/or shielding these regions including any wires, devices and/or structures within these regions from the electromagnetic field. The magnetic flux concentrator may be formed of various materials that serve to reflect or redirect an electromagnetic field including, for example, Fluxrol™ material provided by Fluxtrol Inc. or any other material having a desired electrical conductivity and magnetic permeability. For example, the concentrator may be constructed so as to have a very low (ideally zero) conductivity, but a very high (ideally >>1) relative magnetic permeability. For example, a powder of the magnetic material, such as a ferrite, nickel, iron or other magnetic material, may be poured into a substance, such as an elastomeric or epoxy material, that solidifies such that there is no contact between the particles of the magnetic material.

In one embodiment, the electromagnetic field, in turn, creates an eddy current in an electrically conductive layer, such as the erosion barrier 70, that lies within the electromagnetic field. The circulating eddy current, in turn, experiences electrical resistance within the electrically conductive layer, e.g., the erosion barrier, which generates heat. The heat generated by the electrically conductive layer of this embodiment serves to prevent the formation of ice and/or reduces the formation of ice upon the engine nacelle inlet or other aerodynamic surface.

The ice protection system 10 of an example embodiment also includes a susceptor 76 formed of a ferromagnetic material, such as ferrites, nickel- or iron-based alloys or other magnetic materials having a relatively large relative magnetic permeability, such as a relative magnetic permeability that greatly exceeds 1, e.g., >>1. The susceptor is positioned proximate an outer mold line of the leading edge of the aerodynamic surface. For example, the susceptor may be located at the outer mold line so as to define the outer mold line of the leading edge of the aerodynamic surface. Alternatively, the susceptor may be located inward of the outer mold line of the leading edge of the aerodynamic surface, but may be located sufficiently close to the outer mold line so as to be in direct thermal communication therewith. The electromagnetic field generated by the alternating current flowing through the induction coils 74 creates an eddy current in the susceptor which, in turn, generates heat so as to heat the leading edge of the aerodynamic surface in order to prevent, reduce or otherwise protect against the accumulation of ice upon the leading edge of the aerodynamic surface. See operations 88 and 90 of FIG. 5. By utilizing a susceptor to generate heat, the susceptor may be positioned proximate the leading edge of the aerodynamic surface such that the exterior surface, but not interior portions, are primarily heated such that the heating is performed efficiently and power requirements may be reduced.

The magnetic susceptor 76 may be formed from a solid sheet material or from multiple wires having a specific magnetic permeability and resistivity. The thickness of a solid material or wires may be defined based on the required temperature profile and magnetic (permeability or susceptibility) and electric (conductivity) properties of the material itself. In an instance in which the magnetic susceptor is formed of wires, the wires are electrically conducting and magnetic and have a cross-sectional diameter that is at least several skin depths so that the eddy currents can flow around the circumference of the wire. When the wires reach the Curie temperature, the skin depth becomes so large that the eddy currents are choked off and the heating is reduced to a low level, thereby preventing overheating. The wires may be connected in parallel or in series or individually. The wires may comprise a mesh with a density that is specific to the temperature profile and with any form, such as square, rectangular, oval, round, hexagonal, octagonal or the like. The susceptor may be made from various materials including, for example, a Nickel-based, iron-based or other magnetic material. The magnetic susceptor can also be deposited onto the composite material or erosion shield using techniques similar to vapor or powder deposition. Alternatively, the solid sheet of a magnetic susceptor may be bonded to the erosion shield or a composite structure. Still further, the wires in a mesh or in another form can be bonded to or embedded into the composite stricture or erosion shield or another external surface.

In one embodiment in which the ice protection system includes an erosion control layer 70 that defines the outer mold line, the susceptor may form the erosion control layer and, as a result, may be located at the outer mold line of the leading edge of the aerodynamic surface. Alternatively, the susceptor 76 may be located interior of, but adjacent to the erosion control layer. In this embodiment, heat generated by the eddy current in the susceptor may heat the erosion control layer so as to protect against ice formation thereon.

In another embodiment, the leading edge may be formed of a non-magnetic material 78, such as titanium or aluminum. The leading edge may be formed of a non-magnetic material for various reasons including for protection with respect to lightning strikes and/or to prevent corrosion formation. In this embodiment, the susceptor 76 may be positioned within the non-magnetic material. For example, the susceptor of this embodiment may be formed of a plurality of wires formed of a ferromagnetic material. The ferromagnetic wires may be embedded within the non-magnetic material that forms the the leading edge. Thus, the electromagnetic field created by the alternating current flowing through the induction coils 74 creates eddy currents within the ferromagnetic wires that form the susceptor and, in turn, heats the non-magnetic material that forms the leading edge of the aerodynamic surface in this embodiment. Alternatively, the susceptor may be positioned interior of, but in thermal communication with, such as by being adjacent to, the non-magnetic material as shown in FIG. 6 such that the flow of eddy current through the susceptor heats the susceptor and, in turn, the non-magnetic material that forms the leading edge.

The ferromagnetic material of the susceptor 76 has a Curie point. As such, the susceptor will only be heated by the eddy currents that are induced to flow therein to a temperature established by the Curie point. Thus, the heating of the leading edge of the aerodynamic surface by the susceptor is limited by the Curie point of the ferromagnetic material that forms the susceptor. By appropriate selection of the ferromagnetic material that forms the susceptor, the ferromagnetic material may have a Curie point that is sufficiently high so as to protect against formation of ice on the leading edge of the aerodynamic surface, but also sufficient low so that the susceptor is never heated to a temperature that could cause damage to other components of the aerodynamic surface that are proximate thereto. For example, the ferromagnetic material that forms the susceptor may include high nickel alloys such as Ni96Cr4 or the like that are both corrosion resistant and have a Curie point above 32° F. for anti-icing and de-icing and less than 180° F. to prevent damage to the composite structure.

As described above, the induction coils 74 may be positioned interior of the susceptor 76. For example, the ice protection system 10 may include a supporting structure interior of the susceptor relative to the outer mold line. In one embodiment, the supporting structure may be the acoustic liner 60 of an engine nacelle 24. Alternatively, the supporting structure may be a composite structure 79, such as a plurality of composite plies, e.g., the composite plies that may form a skin structure, as shown in FIG. 6. As the foregoing examples illustrate, the supporting structure may be electrically and/or thermally insulative. As described above, the induction coils may be positioned interior of the supporting structure so as so be spaced from the susceptor by the supporting structure. As a result of the electromagnetic field generated by the alternating current flowing through the induction coils, however, eddy currents may be induced in the susceptor so as to heat the leading edge of the aerodynamic surface even though the susceptor is spaced apart from the induction coil but a supporting structure that, in some embodiments, is thermally and electrically insulative.

By positioning the susceptor 76 proximate the outer mold line of the leading edge of the aerodynamic surface, the susceptor of at least some embodiments may be repaired or replaced in an efficient manner, such as without having to replace the entire aerodynamic surface. Similarly, by positioning the induction coils 74 proximate the inner mold line in at least some embodiments, the induction coils may be repaired or replaced in an efficient manner, such as without having to replace the entire aerodynamic surface. By way of example, an applique 100 may include the susceptor and may be attached to or incorporated within the aerodynamic surface such that the applique including the susceptor is configured to heat the outer mold line of the leading edge of the aerodynamic surface. In this regard, the applique may be formed of a polymer material, such as a rubber, within which the susceptor is embedded. See operation 80 of FIG. 5. The applique may also include an adhesive, such as an epoxy, that attaches the applique to the leading edge of the aerodynamic surface. As such, to repair or replace the susceptor of one embodiment, the applique may be removed and another applique including a susceptor may be attached to the leading edge of the aerodynamic surface such that the aerodynamic surface does not need to be removed from service for very long.

By way of example, an applique 102 may be provided that includes the induction coils 74 and that is attached to the inner mold line of the aerodynamic surface. See operation 80 of FIG. 5. As described above, the applique may be formed of a polymer, such as a rubber, material and the at least one induction coil may be embedded therein. The applique that includes the induction coils may also include an adhesive, such as an epoxy, for attaching the applique including the induction coils to the inner mold line of the aerodynamic surface. As such, the induction coils may be repaired or replaced in accordance with this embodiment by removing the applique from the inner mold line and attaching another applique including at least one induction coil to the inner mold line such that the aerodynamic surface need not be removed from service for very long.

Figure 7:
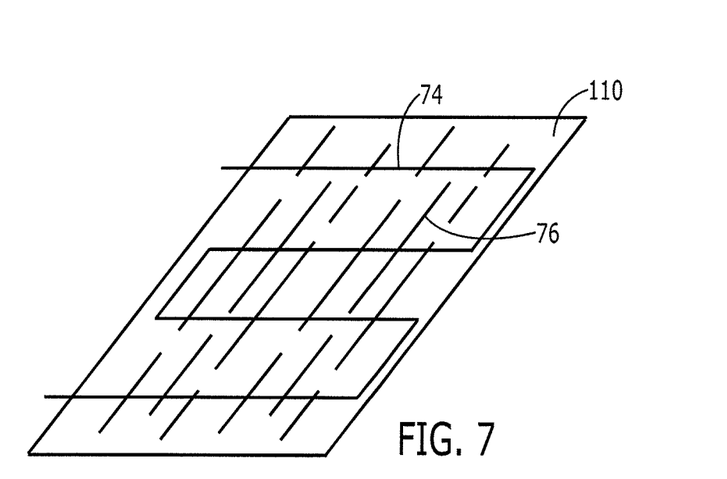
FIG. 7 is a schematic representation of an applique that includes an induction coil and a susceptor in accordance with an embodiment of the present disclosure.

As described, the induction coils 74 and the susceptor 76 may be spaced apart from one another with the supporting structure 78 or other components of the aerodynamic surface positioned therebetween. However, the ice protection system 10 of one embodiment may be configured such that the induction coils are proximate the susceptor at the outer mold line, such as in instances in which the inner mold line is not readily accessible. For example, an applique may include both the induction coils and the susceptor and may be attached to the outer mold line of the leading edge of the aerodynamic surface. As shown schematically in FIG. 7, an applique 110 may include a susceptor comprised of a plurality of wires formed of a ferromagnetic material and an induction coil in the form of an induction wire, such as a Litz wire, that are integrated into a thin plain weave. In this regard, the plurality of ferromagnetic wires that form the susceptor may be disposed within or upon that polymer material of the applique with the induction wires generally extending perpendicular to the susceptor wires. The induction wire may be woven through the ferromagnetic wire, such as shown in FIG. 7. By passing an alternating current through the induction wire, an electromagnetic field may be generated which, in turn, creates eddy currents within the ferromagnetic wires and causes heat to be generated so as to heat the leading edge of the aerodynamic surface.

Regardless of whether the induction coils 74 are positioned proximate the inner mold line or the outer mold line, the induction coils may be located at a number of positions along the aerodynamic surface that are selected to correspond to different portions of the leading edge of the aerodynamic surface that is to be heated. While the ice protection system 10 may be configured so as to heat one portion of the leading edge of an engine nacelle inlet 30 or other aerodynamic surface, the ice protection system generally includes a plurality of induction coils positioned so as to provide relatively even heating to the leading edge of the aerodynamic surface. The number of induction coils and their respective shapes, sizes and positions generally depend upon the desired penetration depth which, in turn, may be dependent upon the inlet geometry, the inlet mass flow and the material forming the inlet. The number of induction coils and their respective shapes, sizes and positions may be determined in various manners including icing tunnel testing at various simulated flight conditions. As shown in FIG. 4, for example, induction coils may be positioned relative to an engine nacelle inlet such that one induction coil serves to heat the outer lip 54 and the second induction coil serves to heat the inner lip 56. Although the embodiment of FIG. 4 depicts a single induction coil proximate the outer lip and a single induction coil proximate the inner lip, the ice protection system of other embodiments may include multiple induction coils proximate different portions of the outer lip and/or multiple induction coils proximate different portions of the inner lip with induction coils positioned at different distances from the hilite 52.

Figure 8:
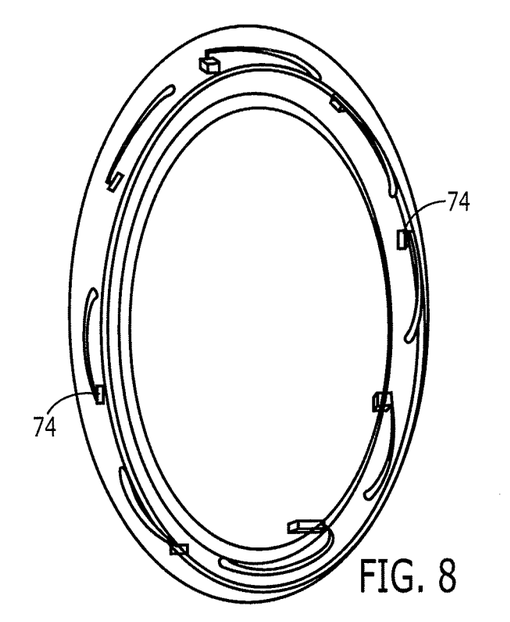
FIG. 8 is a schematic representation of a portion of an engine nacelle inlet having a plurality of induction coils spaced circumferentially thereabout in accordance with one embodiment of the present disclosure.

As the engine nacelle inlet 30 is an annular structure, the ice protection system 10 may also include a plurality of induction coils 74 positioned at different circumferential locations about the engine nacelle inlet as shown in FIG. 8. In this regard, the ice protection system may include a first plurality of induction coils circumferentially positioned about the engine nacelle inlet so as to heat the outer lip 54, and a second plurality of induction coils circumferentially spaced about the engine nacelle inlet so as to heat the inner lip 56. Relative to FIG. 8, however, only one of the first and second pluralities of induction coils is depicted for purposes of illustration.

As illustrated in conjunction with FIGS. 3, 4, 6 and 8, the induction coils 74 may therefore be spaced apart from other induction coils so as to principally heat different corresponding portions of the leading edge of the aerodynamic surface. Indeed, as represented by the looping path extending from each induction coil in FIG. 8, the eddy currents generated by actuation of the induction coils generally propagate through a portion of the susceptor 76 that is most proximate to the respective induction coil such that actuation of an induction coil generally heats a corresponding portion of the leading edge of the aerodynamic surface that is proximate that portion of the susceptor in which eddy currents are induced.

Figure 9:
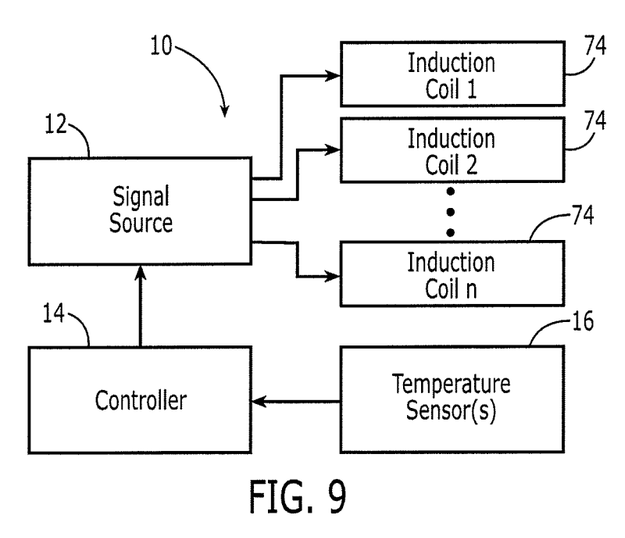
FIG. 9 is a block diagram of an ice protection system in accordance with one embodiment of the present disclosure.

As illustrated in FIG. 9, the ice protection system 10 may include a signal source 12 configured to provide alternating current, such as alternating radio frequency current, to the induction coils 74. Although the signal source may be configured in various manners, the signal source of one embodiment is an electrical signal source configured to generate alternating signals having any desired shape and frequency including, for example, radio frequency signals having square, sinusoidal or triangular waves. The signal source of one embodiment may be a variable frequency power supply. The frequency could be selected to minimize interference with other aircraft systems. In some embodiments, the ice protection system may include induction coils that have different configurations, such as different operating frequencies and/or different capacitances, in order to appropriately thermally excite the respective areas heated with each induction coil, thereby potentially conserving power and/or reducing the overall weight of the ice protection system.

The signal source 12 may be configured to concurrently provide alternating current to each of the induction coils 74 such that each of the induction coils is energized at the same time. Alternatively, the signal source may be configured to provide alternating current to one or more of the induction coils, but not to others of the induction coils during a first time period. During a later time period, the signal source may then provide alternating current to a different subset of the induction coils such that the induction coils are alternately activated in a scheduled or other controllable fashion.

In this regard, the ice protection system 10 may include a controller 14 configured to direct the operations of the signal source 12. In this regard, the controller may provide instructions regarding which induction coils to be activated during each time period. In one embodiment, the controller may also provide instructions to the signal source regarding the magnitude and/or frequency of the alternating current to be provided to the induction coils 74. The controller may operate in accordance to the predefined schedule that defines the induction coils to be activated and, of those to be activated, the manner in which each induction coil is to be driven during each of a plurality of time periods. For example, it may be known that certain portions of the aerodynamic surface have a much greater likelihood of ice formation than other portions such that the controller may direct the signal source to more frequently activate the induction coils corresponding to that portion of the aerodynamic surface that is more likely to experience ice formation and to less frequently activate the induction coils corresponding to that portion of the aerodynamic surface that is less likely to experience ice formation. As such, the power consumed by the ice protection system may be judiciously managed with the power supply required for operation of the ice protection system potentially being reduced in size and weight relative to conventional ice protection systems.

In one embodiment, the ice protection system 10 also includes one or more temperature sensors 16 for monitoring the temperature of respective portions of the exterior surface. See operation 92 of FIG. 5. The temperature sensors may provide data to the controller 14 representative of the temperature of other respective portions of the exterior surface. The controller, in turn, may be configured to direct the signal source 12 to activate selected ones of the induction coils 74 based upon the temperature of those portions of the exterior surface corresponding to the different induction coils. See operation 82. In this regard, a portion of the exterior surface and an induction coil may correspond in instances in which a portion of the exterior surface is heated in response to activation of a respective induction coil. In one embodiment, a predefined threshold may be defined with temperatures below the predefined threshold triggering activation of the corresponding induction coils and temperatures above the threshold triggering deactivation of the corresponding induction coils. The threshold may be defined at different levels, but in one embodiment is set to be 35° F.

In one embodiment which includes a plurality of induction coils 74 and a corresponding plurality of temperature sensors 16, the controller 14 includes or is configured to access from an associated memory device a listing that associates each temperature sensor with one or more corresponding induction coils that are positioned so as to heat the portion of the exterior surface with which the respective temperature sensor is associated. In operation, the controller can therefore receive temperature data from the plurality of temperature sensors. In this regard, the temperature sensor can provide data along with an identification of the respective temperature sensor such that the controller can determine not only the sensed temperature, but also the temperature sensor that provided the data. The controller may then determine which of the temperature sensors provided data indicating that the temperature of the corresponding portion of the exterior surface is less than the threshold and may, in turn, direct the signal source to activate the induction coils associated with the temperature sensors that reported temperatures less than the threshold. The controller can also determine the temperature sensors that provided data indicative of temperatures greater than the threshold and may, in turn, direct the signal source to deactivate the induction coils corresponding to those temperature sensors that reported temperatures greater than the threshold. As such, the ice protection system of the embodiment may not only affect the prevention or reduction of ice formation, but may do so in an efficient manner by only activating an induction coil and therefore drawing current in instances in which the controller determines such activation to be necessary to prevent or reduce ice formation.

By selectively activating the induction coils 74, the power requirements may be reduced, thereby potentially permitting a smaller, lighter and less expensive power supply to be employed. Additionally, the ice protection system 10 may be lighter than some conventional systems by utilizing induction coils which can heat different regions of an aerodynamic surface. Further, the ice protection system and method are not dependent upon bleed air and is therefore widely applicable including, for example, with electric aircraft.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An ice protection system comprising:
    an aerodynamic surface comprising a leading edge having an external surface comprised of a non-magnetic material and a susceptor formed of a ferromagnetic material interior of and in thermal communication with the non-magnetic material that forms the exterior surface of the leading edge relative to an outer mold line of the leading edge of the aerodynamic surface, wherein the aerodynamic surface further comprises an acoustic liner comprising a honeycomb core, and an erosion control layer comprising the susceptor overlying the acoustic liner and defining perforations in communication with the honeycomb core;
    at least one induction coil positioned interior of the acoustic liner so as to be spaced apart from the susceptor by the acoustic liner; and
    a signal source configured to provide alternating current to the at least one induction coil to thereby generate an electromagnetic field that creates an eddy current in the susceptor so as to heat the leading edge of the aerodynamic surface.

2. An ice protection system in accordance with claim 1 wherein the acoustic liner further comprises a face sheet defining perforations opening into the honeycomb core and a back sheet disposed opposite the face sheet relative to the honeycomb core, wherein the perforations defined by the face sheet, and wherein the erosion control layer comprises the provides erosion protection.

3. An ice protection system in accordance with claim 1 further comprises an applique that comprises a polymer material, the susceptor embedded within the polymer material and an adhesive configured to attach the applique to the leading edge of the aerodynamic surface.

4. An ice protection system in accordance with claim 1 further comprising a supporting structure interior of the susceptor relative to the outer mold line, wherein the supporting structure is thermally and electrically insulative, and wherein the at least one induction coil is positioned interior of the supporting structure so as to be spaced from the susceptor by the supporting structure.

5. An ice protection system in accordance with claim 1 further comprises an applique that comprises a polymer material, the at least one induction coil embedded within the polymer material and an adhesive configured to attach the applique to an inner mold line of the aerodynamic surface.

6. An ice protection system in accordance with claim 1 wherein the at least one induction coil is proximate to an inner mold line of the aerodynamic surface.

7. An ice protection system in accordance with claim 1 wherein the susceptor is embedded within the non-magnetic material of the leading edge.

8. An ice protection system in accordance with claim 1 wherein the susceptor is positioned interior of but in thermal communication with the non-magnetic material.

9. An ice protection system in accordance with claim 1 wherein the ferromagnetic material of the susceptor has a Curie point such that heating of the leading edge of the aerodynamic surface by the susceptor is limited thereby.

10. An ice protection system in accordance with claim 1 further comprising a magnetic flux concentrator positioned interior of the at least one induction coil so as to be spaced apart from the susceptor by the at least one induction coil, wherein the magnetic flux concentrator is configured to redirect the electromagnetic field toward the susceptor.

11. An ice protection system in accordance with claim 1 wherein the aerodynamic surface is selected from the group consisting of a leading edge flap of a wing, a leading edge of a wing, a leading edge of a wind turbine blade, a leading edge of an engine nacelle inlet, a leading edge of a rotorcraft blade, a leading edge of an empennage and a nose of an aircraft.

12. An ice protection method for an aerodynamic surface comprising a leading edge having an external surface comprised of a non-magnetic material and a susceptor formed of a ferromagnetic material interior of and in thermal communication with the non-magnetic material that forms the exterior surface of the leading edge relative to an outer mold line of the leading edge of the aerodynamic surface, the method comprising:
    providing erosion protection with an erosion control layer of the aerodynamic surface that comprises the susceptor and that overlies an acoustic liner of the aerodynamic surface, wherein the erosion control layer defines perforations in communication with a honeycomb core of the acoustic liner;

providing alternating current to at least one induction coil positioned interior of the acoustic liner so as to be spaced apart from the susceptor by the acoustic liner;

generating an electromagnetic field in response to the alternating current that creates an eddy current in the susceptor formed of a ferromagnetic material and positioned proximate the outer mold line of the leading edge of the aerodynamic surface; and heating the leading edge of the aerodynamic surface in response to the eddy current created in the susceptor.

13. An ice protection method in accordance with claim 12 further comprising applying an applique that comprises a polymer material, the susceptor embedded within the polymer material and an adhesive to the leading edge of the aerodynamic surface.

14. An ice protection method in accordance with claim 12 further comprising providing a supporting structure interior of the susceptor relative to the outer mold line, wherein the supporting structure is thermally and electrically insulative, and wherein the at least one induction coil is positioned interior of the supporting structure so as to be spaced from the susceptor by the supporting structure.

15. An ice protection method in accordance with claim 12 further comprising applying an applique that comprises a polymer material, the at least one induction coil embedded within the polymer material and an adhesive configured to attach the applique to an inner mold line of the aerodynamic surface.

16. An ice protection method in accordance with claim 12 wherein the susceptor is embedded within the non-magnetic material of the leading edge.

17. An ice protection method in accordance with claim 12 wherein the susceptor is positioned interior of but in thermal communication with the non-magnetic material.

18. An ice protection method in accordance with claim 12 wherein the ferromagnetic material of the susceptor has a Curie point, and wherein heating the aerodynamic surface comprising limiting the heating of the aerodynamic surface by the susceptor based upon the Curie point of the susceptor.

19. An ice protection method in accordance with claim 12 further comprising redirecting the electromagnetic field generated by the at least one induction coil toward the susceptor with a magnetic flux concentrator positioned interior of the at least one induction coil so as to be spaced apart from the susceptor by the at least one induction coil.

20. An ice protection method in accordance with claim 12 wherein heating the leading edge of the aerodynamic surface comprises heating the leading edge of the aerodynamic surface that is selected from the group consisting of a leading edge flap of a wing, a leading edge of a wing, a leading edge of a wind turbine blade, a leading edge of an engine nacelle inlet, a leading edge of a rotorcraft blade, a leading edge of an empennage and a nose of an aircraft.

* * * * *